Dec. 7, 1943.   C. J. STUART   2,336,044
LOCKING MECHANISM
Filed May 20, 1943
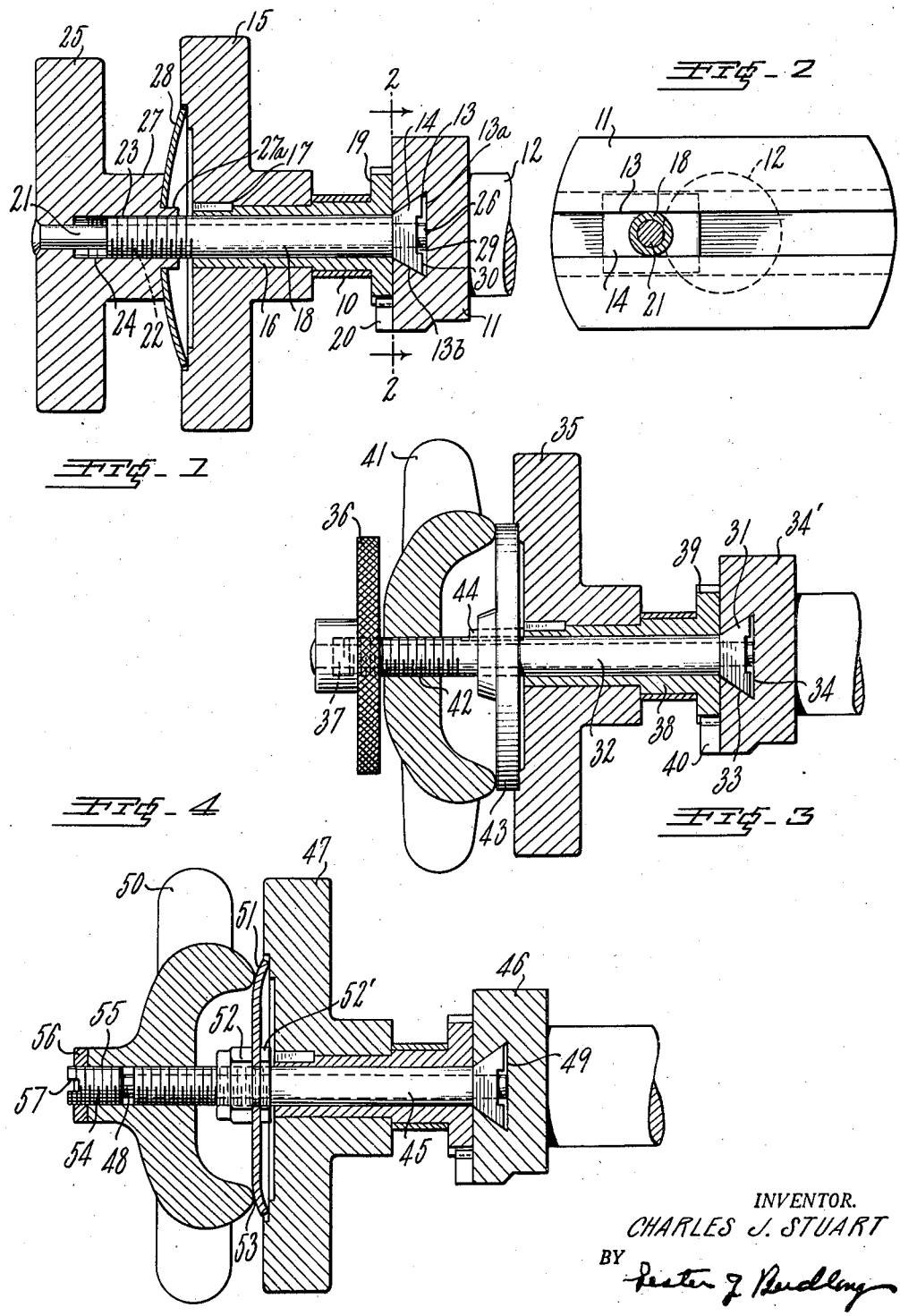
INVENTOR.
CHARLES J. STUART
BY
ATTORNEY Patented Dec. 7, 1943

2,336,044

UNITED STATES PATENT OFFICE 2,336,044

LOCKING MECHANISM

Charles J. Stuart, Winchester, Mass., assignor to Wellman Company, Medford, Mass., a corporation of Maine Application May 20, 1943, Serial No. 487,699

10 Claims. (Cl. 287—53)

This invention relates to an improved locking mechanism, and particularly to such locking mechanism for locking an adjustable support in its adjusted position on a rotatable head.

The invention is particularly useful for locking a support, such as a crank pin, in its adjusted position of eccentricity upon its rotatable base, or crank disc. Various locking mechanisms have been proposed for this purpose. In the prior mechanisms considerable manual force was required to lock the crank pin in its adjusted position, and sometimes the mechanisms were unlocked by the rotating and vibratory motions to which it was subjected. In the mechanism embodying the present invention, a relatively small amount of manual force is required to lock the crank pin support in its adjusted position, and when locked it is securely held in place. When it is desired to readjust the support, it can be quickly released and locked in its new position. While the mechanism has these advantages it is of a simple and economical construction.

The details of the mechanism embodying this invention will be described in reference to the accompanying drawing, in which:

Fig. 1 is a longitudinal cross-sectional view of the locking mechanism embodying the invention;

Fig. 2 is a section of the mechanism illustrated in Fig. 1, and taken on the line 2—2, looking in the direction of the arrows;

Figs. 3 and 4 are longitudinal cross-sectional views of different forms of the invention.

As shown in the drawing, this invention is illustrated in reference to a locking mechanism for locking a crank pin 10 upon a rotatable base, or crank disc 11, which is driven by a shaft 12. As shown in Figs. 1 and 2, the crank disc 11 is provided with a socket, or groove 13, along which the crank pin 10 may be moved to adjust its eccentricity by sliding the supporting head 14 therein. The groove 13 is provided with a bottom wall 13a and overhanging side walls 13b. The groove 13 preferably has a dovetailed cross sectional shape and the head has a corresponding shape. The adjustment of the crank pin 10 is made by a hand wheel 15 while the mechanism is unlocked. The hand wheel 15 is fixed to a bushing 16 by a key 17. The crank pin 10 is a part of the bushing 16 which is rotatably mounted upon the supporting stem 18 carried by the head 14. A gear 19 is formed on the end of the bushing 16, and it meshes with a rack 20 which is secured to the crank disc 11 in parallel relation to the groove 13. A sleeve around the bushing 16 forms the bearing surface of the crank pin, and it is adjusted by operating the gear along the rack 20 by means of the hand wheel 15.

The crank pin 10 and its adjusting mechanism are locked in place by means of a pin 21 which extends through a bore 22 in the crank pin support 18. The outer end of the support 18 is provided with screw threads 23 which are threadedly engaged by threads in a bore 24 in a manually operated locking nut 25. The outer end of the pin 21 is secured to the locking nut 25, and the inner end 26 of the pin is adapted to be projected against the bottom of the groove 13 in the crank disc 11 by the locking nut 25 when it is screwed downwardly on the crank pin support 18. The locking nut 25 is provided with a hub 27, and a spring disc 28 is positioned between the hub 27 and hand wheel 15 so as to exert resilient pressure between these members longitudinally of the crank pin support 18. The spring disc 28 is provided with a central opening into which a reduced portion 27a of the hub 27 fits for the purpose of holding the disc concentric with the crank pin support 18. The spring disc 28 acts to maintain the adjusting gear 19 against the crank disc 11 so that it will be maintained in mesh with the rack 20 while the adjusting mechanism is in its unlocked position.

The locking mechanism is in its unlocked position when the locking nut 25 is screwed outwardly along the crank pin support 18 so as to remove the inner end 26 of the pin 21 from contact with the bottom of the groove 13. When the mechanism is in this unlocked position the adjusting hand wheel 15 may be turned so as to cause the gear 19 to travel along the fixed rack 20 and thereby move the head 14 of the crank pin support 18 along the groove to the desired adjusted position. The mechanism may then be locked in this position by screwing the nut 25 inwardly along the crank pin support 18 so as to cause the end 26 to be forced against the bottom of the groove 13 and at the same time draw the head 14 of the support outwardly against the side walls of the groove which overhang the head 14.

The pin 21 is preferably made of harder metal than the disc 11, and due to the pressure exerted by the end 26 upon the bottom of the groove 13, small indentations are made in the bottom surface of the groove. The pin fits into these indentations and securely holds the head 14 against movement therein. A longitudinal channel 29 is formed centrally on the outer surface of the head 14 so that the head will not contact the scarred surface of the bottom of the groove 13, which might interfere with the sliding movement of the head in the groove 13 when it was being adjusted. The projecting outer margins 30 of the head 14 are adapted to contact with the smooth surface of the bottom of the groove during the sliding adjusting movement. At that time the end 26 of the rod 21 is drawn into the channel 29 so that the end will not contact the rough surface of the bottom of the groove 13 opposite the channel 29.

In the form of the locking mechanism shown in Fig. 3, additional means is provided for drawing the head 31 of the crank pin support 32 against the side walls 33 of the groove 34 in the disc 34', and also to prevent the rotation of the adjusting hand wheel 35 on the support 32 so as to more securely lock the support 32 in its adjusted position. Ordinarily such additional means is not necessary to lock the mechanism in place, but it is provided in this instance where a larger margin of safety may be demanded. The locking nut 36 operates the pin 37 to lock the head 31 of the support 32 in the crank disc 34', and the adjusting wheel 35 through the bushing 38 operates the gear 39 on the rack 40 so as to adjust the crank pin support 32 in respect to the crank disc 34'. The operation of the foregoing elements is the same as the corresponding elements described in reference to Fig. 1, and they are not described in detail in reference to this figure.

The additional means for locking the mechanism in place comprises a second locking nut 41 provided with a bore having threaded engagement with screw threads 42 on the outer end of the supporting stem 32 with which the threads in the nut 36 also engage. A disc 43 is slidably, but non-rotatably mounted on the stem 32 between the second locking nut 41 and the adjusting hand wheel 35. The slidable, but non-rotatable connection is formed by a key 44 secured to the hub of the disc 43, and adapted to slide in a groove in the crank pin support 32.

Assuming the locking nuts 36 and 41 have been screwed outwardly on the stem 32 so that the mechanism is in its freely movable position, it is operated by first turning the hand wheel 35 to move the crank pin support 32 to its desired position. The second locking nut 41 is then turned downwardly on the support 32 until the disc 43 is tightly clamped between the nut 41 and the wheel 35. Then the nut 36 is turned to project the end of the rod 37 against the bottom of the groove 34. The downward movement of the second locking nut 41 forces the disc 43 against the hand wheel 35 and in turn forces the gear 39 against the crank disc 34'. Such movement results in clamping the hand wheel 35 against rotation due to the friction between it and the non-rotatable disc, and due to the friction between the gear 39 and the crank disc 34'. Such movement of the nut 41 also forces the supporting head 31 with greater pressure against the side walls 33 of the groove 34, and locks it more securely in place.

A further form of the invention is shown in Fig. 4, in which the crank pin support 45 is adjusted on the crank disc 46 by means of the adjusting hand wheel 47 in the same manner as described in reference to Figs. 1 to 3 inclusive. In this form of the invention the rod 48 which extends through the crank pin support 45 against the bottom of the groove 49 is operated by the locking nut 50, which simultaneously operates the periphery of a spring disc 51 against the adjusting hand wheel 47 to provide the additional locking means.

The spring disc 51 is rigidly clamped to the crank pin support 45 between the nuts 52 and 52' which threadedly engage threads on the support 45. When the rim 53 of the locking nut 50 comes in contact with the outer periphery of the disc 51 it is forced against the adjusting hand wheel 47 and frictionally clamps it against rotation on the support 45 between the spring disc 51 and the crank disc 46. The head of the support 45 is also clamped with greater pressure against the side walls of the groove 49 by the pressure between the nut 50 and the hand wheel 47.

In order to co-ordinate the contact of the rim 53 with the disc 51, and the contact of the end of the rod 48 with the bottom of the groove 49, an adjustable connection is provided between the rod 48 and the locking nut 50. Such connection comprises screw threads on the head 54 of the rod 48 which threadedly engage the threaded bore 55 in the locking nut 50. When the locking nut 56, which threadedly engages the threads on the head 54, is backed away from the hub of the nut 50, the rod 48 may be screwed in or out of the bore 55 by placing a screw driver in the slot 57. When the rod has been properly adjusted so that the locking nut 50 exerts the desired pressure on the disc 51 when the end of the rod 48 contacts the bottom of the groove, then the head 54 is locked in place by means of the locking nut 56. When this is done, the mechanism will be in proper adjustment to force the end of the rod 48 against the bottom of the groove 49 with the desired pressure when the desired pressure is exerted between the locking nut 50 and the hand wheel 47 to prevent the rotation of the latter on the support 45.

While several forms of this invention have been described in detail, it will be understood that changes may be made without departing from the spirit of the invention and the scope of the appended claims.

Having thus described my invention, what I claim and desire to protect by Letters Patent is:

1. A locking mechanism comprising a member having a socket therein, said socket having a bottom wall and overhanging side walls, a support projecting from said member, a head on said support positioned in said socket and overhung by said side walls, an elongated member extending through said support, and means for moving said elongated member inwardly against said bottom wall and said head outwardly against said side walls by exerting pressure between said elongated member and said support so as to lock said head in said socket.

2. A locking mechanism comprising a member having a socket therein, said socket having a bottom wall and separated side walls converging towards each other in the direction away from said bottom wall, a hollow support projecting outward between said side walls and having a head positioned within and adapted to be secured in said socket, said support having a threaded outer end, a rotatable member having a bore threadedly engaging said threads on said support, an elongated member extending through said support and adapted to be moved longitudinally of said support by the rotation of said rotatable member so as to force the end of said elongated member against the bottom wall of said socket and said head against the side walls of said socket.

3. A locking mechanism comprising a base for said mechanism, said base having a socket formed therein, said socket having a bottom wall and overhanging side walls, a hollow supporting stem projecting from said base and between said side walls, said stem having a head positioned in said socket and overhung by said side walls, an elongated member extending through said stem, screw threads on the outer end of said stem, a rotatable member having threaded engagement with said threads on said stem and secured to said elongated member, and said rotatable member being adapted to be rotated upon said threads so as to move the opposite end of said elongated member against the bottom of said socket and said head against the side walls of said socket.

4. A locking mechanism comprising a base upon which the mechanism is adapted to be adjusted and locked in an adjusted position, said base having an elongated groove formed therein, said groove having a bottom wall and overhanging side walls, a supporting stem having an elongated head positioned in said groove and overhung by said side walls, a rod extending through said stem, and means exerting and maintaining pressure between said supporting stem and said rod for forcing and holding one end of said rod against the bottom of said groove and drawing and holding said head against the side walls of said groove.

5. A locking mechanism comprising a base upon which the mechanism is adapted to be adjusted and locked in an adjusted position, said base having an elongated groove formed therein, said groove having a bottom wall and overhanging side walls, a supporting stem having an elongated head positioned in said groove and overhung by said side walls, said head having a channel in the end surface of said head and extending longitudinally thereof, a rod formed of harder material than said bottom wall extending through said stem and into said channel, and means exerting pressure between said supporting stem and said rod for forcing one end of said rod against the bottom of said groove so as to indent same and to draw said head against the side walls of said groove.

6. A locking mechanism comprising a base upon which it is adapted to be adjusted and locked in an adjusted position, said base having an elongated groove formed therein, said groove having a bottom wall and overhanging side walls, a supporting stem having an elongated head positioned in said groove and overhung by said side walls, a channel in said head extending centrally and longitudinally thereof, a rod extending through said stem and into said channel, means bearing on said stem and said rod for forcing one end of said rod against the bottom of said groove and said head against said overhanging side walls to lock said head in said groove.

7. A locking mechanism comprising a base upon which it is adapted to be adjusted and locked in an adjusted position, said base having an elongated dovetailed groove formed therein, a supporting stem having an elongated head conforming to the shape of said groove and adapted to slide therein, a channel extending longitudinally and centrally of said head, a rod extending through said stem and into said channel, a rotatable member having threaded engagement with the outer end of said stem and fixed to said rod at one end, said rod being adapted to be projected by said rotatable member through said head and against the bottom of said groove and said head against the side walls of said dovetailed groove to lock said head in a fixed position.

8. A locking mechanism comprising a base, said base having a longitudinal groove formed therein, said groove having a bottom wall and spaced side walls overhanging said bottom wall, a supporting stem provided with a head positioned within said groove and overhung by said side walls, said stem having a longitudinal bore extending therethrough, a locking nut having threaded engagement with the outer end of said stem, a rod extending through said bore and connected at its outer end to said locking nut and adapted to be projected against the bottom wall of said groove by the turning movement of said locking nut, an adjusting hand wheel rotatably mounted on said stem between said locking nut and said base, a second locking nut in threaded engagement with said stem and adapted to exert pressure on said hand wheel between said nut and said base to further lock said head of said stem in said groove and to prevent turning movement of said adjusting wheel.

9. A locking mechanism comprising a base having an elongated groove formed therein, said groove having a bottom wall and spaced side walls which overhang said bottom wall, a supporting stem projecting between the side walls of said groove and having a head positioned within and overhung by the side walls of said groove, said stem having a longitudinal bore extending therethrough, a rod extending through said bore, a locking nut having threaded engagement with the outer end of said stem, said rod having one end fixed to said locking nut and the other end adapted to be projected against said bottom wall by the turning movement of said nut so as to draw said head against the overhanging walls of said groove, and adjusting hand wheel rotatably mounted on said stem, a spring member positioned between said hand wheel and said locking nut, and said spring being adapted to exert resilient pressure longitudinally of said stem between said locking nut and said hand wheel.

10. A locking mechanism comprising a base having an elongated groove formed therein, said groove having a bottom wall and spaced side walls which overhang said bottom wall, a supporting stem projecting between the side walls of said groove and having a head positioned within and overhung by the side walls of said groove, said stem having a longitudinal bore extending therethrough, a rod extending through said bore, a locking nut having threaded engagement with the outer end of said stem, said rod having one end fixed to said locking nut and the other end adapted to be projected against said bottom wall by the turning movement of said nut so as to draw said head against the overhanging walls of said groove, an adjusting hand wheel rotatably mounted on said stem, a non-rotatable member positioned between said adjusting hand wheel and said locking nut and adapted to be moved by said locking nut against said hand wheel to resist rotation thereof and means for adjusting said rod axially in respect to said locking nut, and means for locking said rod in the adjusted position.

CHARLES J. STUART.